(12) United States Patent
Mouser et al.

(10) Patent No.: US 10,421,412 B2
(45) Date of Patent: Sep. 24, 2019

(54) ROTATABLE CAMERA

(71) Applicant: NAVIGATION SOLUTIONS, LLC, Plano, TX (US)

(72) Inventors: Michael James Mouser, Parker, TX (US); Donald James Finney, Jr., West Bloomfield, MI (US)

(73) Assignee: The Hertz Corporation, Estero, FL (US)

(*) Notice: Subject to any disclaimer, the term of this patent is extended or adjusted under 35 U.S.C. 154(b) by 487 days.

(21) Appl. No.: 14/689,411

(22) Filed: Apr. 17, 2015

(65) Prior Publication Data
US 2016/0082896 A1 Mar. 24, 2016

Related U.S. Application Data

(60) Provisional application No. 61/980,704, filed on Apr. 17, 2014.

(51) Int. Cl.
*B60R 11/04* (2006.01)
*H04N 7/18* (2006.01)

(52) U.S. Cl.
CPC ............ *B60R 11/04* (2013.01); *H04N 7/183* (2013.01); *B60R 2300/8006* (2013.01)

(58) Field of Classification Search
CPC .. B60R 11/04; B60R 2300/8006; H04N 7/183
USPC ........................................................ 348/148
See application file for complete search history.

(56) References Cited

U.S. PATENT DOCUMENTS

| | | | | |
|---|---|---|---|---|
| 3,689,695 A | * | 9/1972 | Harry | ................. B60R 1/00 348/148 |
| 5,544,206 A | * | 8/1996 | Brooks | ............... G21C 17/007 376/248 |
| 6,685,366 B1 | * | 2/2004 | Corbin | ................. H04N 5/232 348/143 |
| 7,358,498 B2 | * | 4/2008 | Geng | ............ G08B 13/19608 250/347 |
| 8,005,269 B2 | | 8/2011 | Weidhaas | |
| 8,233,046 B2 | | 7/2012 | Ohue et al. | |
| 8,724,021 B2 | * | 5/2014 | Osaka | .................. G06F 1/1686 348/222.1 |
| 8,880,291 B2 | | 11/2014 | Hampiholi | |
| 9,008,840 B1 | * | 4/2015 | Ponulak | ................... B25J 9/163 700/250 |
| 9,022,586 B2 | * | 5/2015 | Englander | ............... B60R 1/083 348/151 |
| 9,535,423 B1 | * | 1/2017 | Debreczeni | .......... G05D 1/0246 |

(Continued)

OTHER PUBLICATIONS

Li et al, Streaming-Viability Analysis and Packet Scheduling for Video Over In-Vehicle Wireless Netoworks, 2007.*

(Continued)

*Primary Examiner* — Shan E Elahi
(74) *Attorney, Agent, or Firm* — Carlson, Gaskey & Olds, P.C.

(57) ABSTRACT

A camera assembly in a vehicle includes a housing installed in the vehicle. A camera is mounted to the housing and movable relative to the housing between a first position where the camera can take an image of an occupant of the vehicle and a second position where the camera is blocked by a portion of the housing. In one example, the camera can be moved from the first position to the second position by rotating a knob mounted to the housing.

21 Claims, 3 Drawing Sheets

(56) References Cited

U.S. PATENT DOCUMENTS

| | | | |
|---|---|---|---|
| 9,674,451 B2* | 6/2017 | Kim | G08B 13/19617 |
| 9,916,538 B2* | 3/2018 | Zadeh | G06N 7/005 |
| 10,075,681 B2* | 9/2018 | Ross | H04N 5/76 |
| 2007/0041727 A1* | 2/2007 | Lee | G03B 17/02 396/427 |
| 2007/0120697 A1* | 5/2007 | Ayoub | B60K 35/00 340/686.1 |
| 2009/0089108 A1* | 4/2009 | Angell | G06Q 10/00 705/7.28 |
| 2009/0091477 A1* | 4/2009 | McCall | G01S 19/42 340/990 |
| 2009/0174774 A1* | 7/2009 | Kinsley | B60R 1/00 348/148 |
| 2010/0079883 A1* | 4/2010 | Englander | B60R 1/083 359/877 |
| 2010/0085440 A1* | 4/2010 | Fujita | G06T 7/74 348/222.1 |
| 2010/0219944 A1* | 9/2010 | McCormick | G07C 5/008 340/436 |
| 2011/0302214 A1* | 12/2011 | Frye | G06F 17/30247 707/802 |
| 2012/0078440 A1* | 3/2012 | Oravis | B60R 1/00 701/1 |
| 2012/0120258 A1* | 5/2012 | Boutell | G03B 11/048 348/207.1 |
| 2012/0148117 A1* | 6/2012 | Chang | G06K 9/00221 382/118 |
| 2012/0235886 A1* | 9/2012 | Border | G02B 27/0093 345/8 |
| 2012/0281097 A1 | 11/2012 | Wood | |
| 2013/0311001 A1* | 11/2013 | Hampiholi | B60R 25/25 701/1 |
| 2014/0309870 A1* | 10/2014 | Ricci | H04W 4/21 701/36 |
| 2015/0298612 A1* | 10/2015 | Englander | B60R 1/083 348/148 |
| 2015/0365603 A1* | 12/2015 | Wahl | G06K 9/00798 348/148 |

OTHER PUBLICATIONS

Larnaout et al, Fast and Automatic City-Scale Environment Modeling for an Accurate 6DOF Vehicle Localization, 2013.*

Sreekala, The Human IRIS Structure and its Application in security system of CAR, 2012.*

* cited by examiner

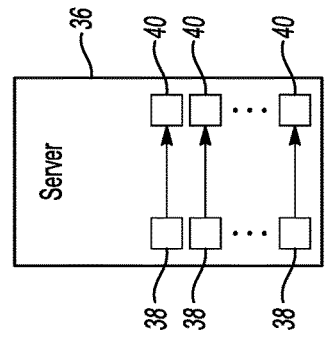
Fig-3
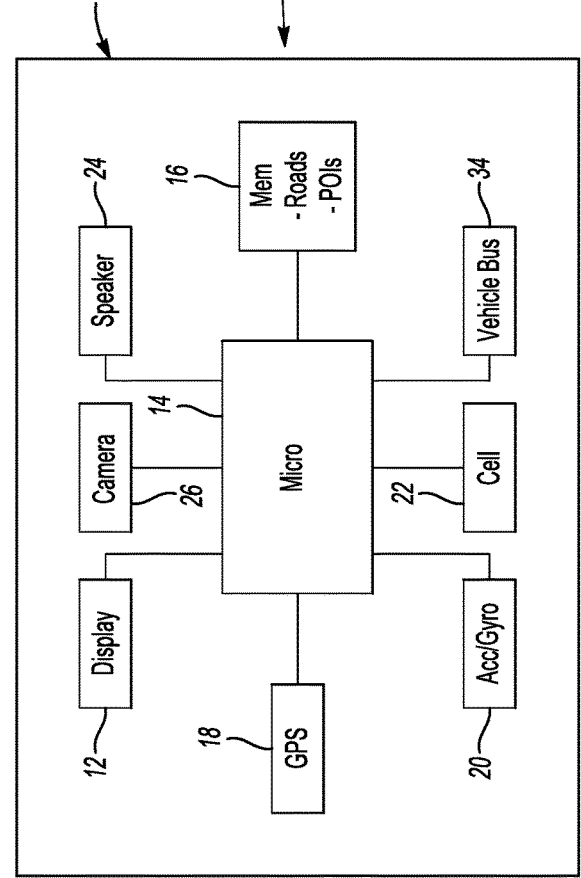
Fig-2
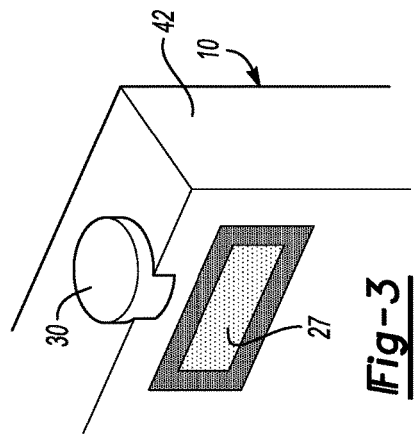
Fig-1
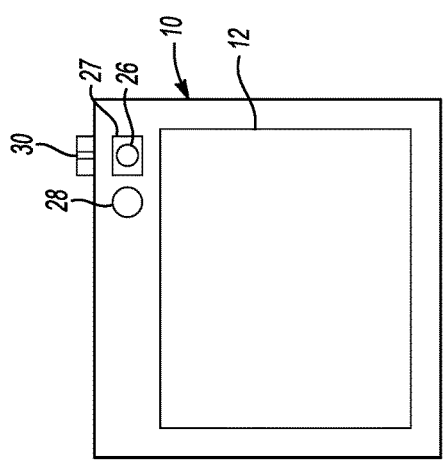

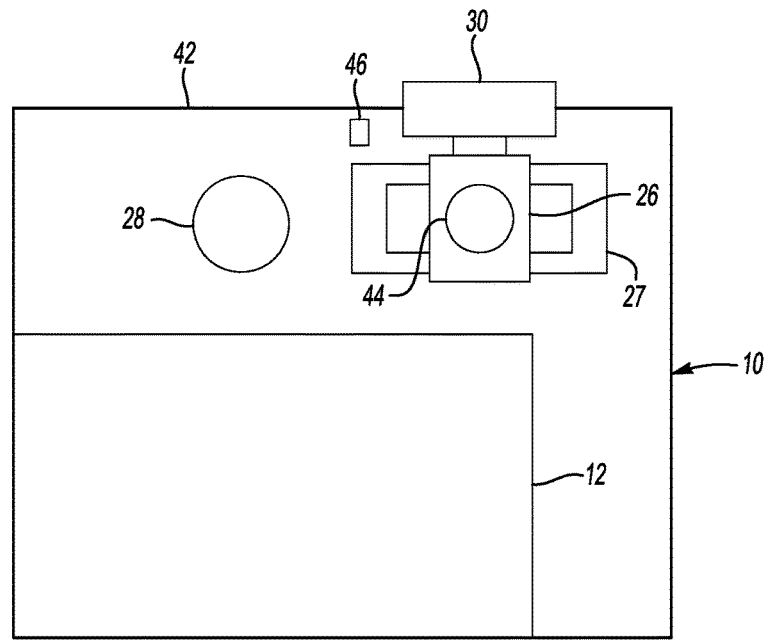
*Fig-4*
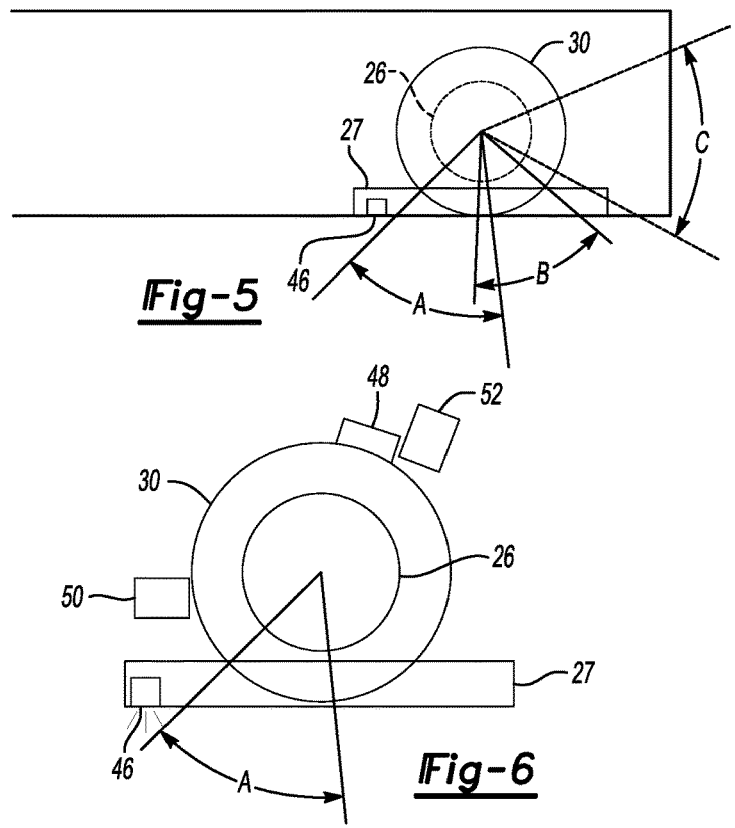
*Fig-5*
*Fig-6*

10,421,412 B2

ROTATABLE CAMERA

BACKGROUND

The present invention provides an authentication system that uses a camera.

There are many ways in which a camera can be used as part of an authentication system. For example, the camera can be used to take an image of a person's face and through facial recognition software determine whether to authenticate that person. However, the presence of the camera can make the person uncomfortable after the authentication is completed.

SUMMARY

A camera assembly in a vehicle includes a housing installed in the vehicle. A camera is mounted to the housing and movable relative to the housing between a first position where the camera can take an image of an occupant of the vehicle and a second position where the camera is blocked by a portion of the housing. In one example, the camera can be moved from the first position to the second position by rotating a knob mounted to the housing.

BRIEF DESCRIPTION OF THE DRAWINGS

FIG. 1 is a front view of an authentication system according to one embodiment of the present invention.

FIG. 2 is a schematic of the authentication system.

FIG. 3 is an enlarged perspective view of one corner of the authentication system.

FIG. 4 is a front wireframe view of the authentication system.

FIG. 5 is a top view of the authentication system.

FIG. 6 shows the camera in a first position.

DESCRIPTION OF A PREFERRED EMBODIMENT

Figure 7:
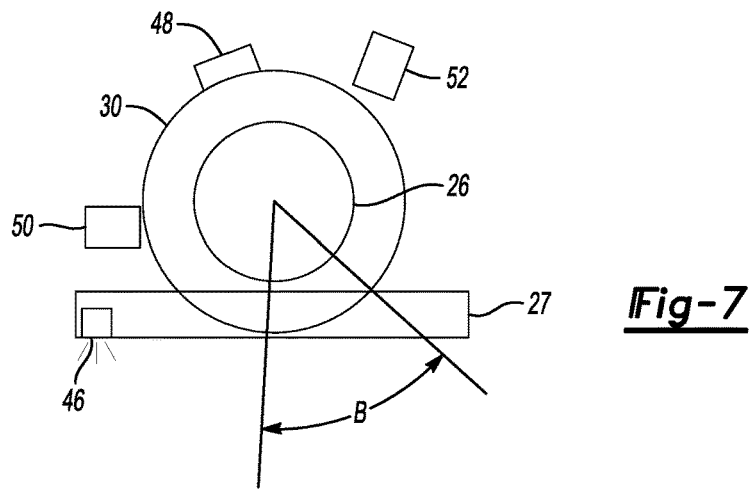
FIG. 7 shows the camera in a second position.
Figure 8:
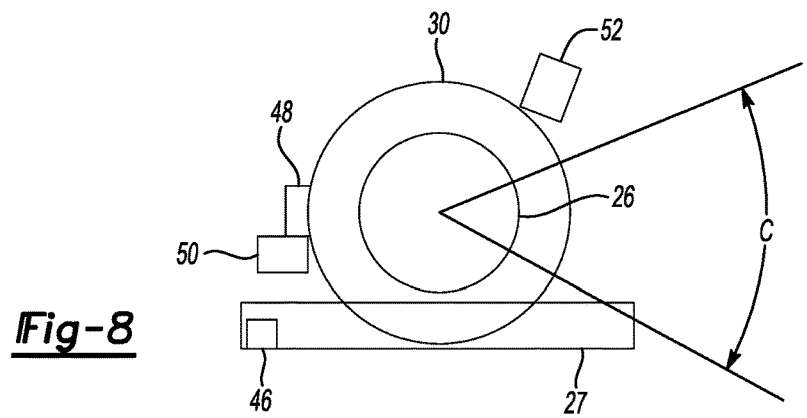
FIG. 8 shows the camera in a third, privacy position.

An authentication system 10 according to one example of the present invention is shown in FIG. 1. The authentication system 10 may include a display 12, which may be a touchscreen display. The authentication system may be installed or at least located in a vehicle (not shown). The authentication system 10 includes an embedded camera 26 (shown behind a window 27), a flash 28 (such as an LED flash) and a rotatable knob 30 proximate the camera 26.

The example embodiment of the authentication system 10 is shown and described herein as part of a navigation system installed into a vehicle; however, it should be noted that the navigation functions are not critical to the present invention. Further, the authentication system 10 could be installed as part of the OEM vehicle equipment, as part of the vehicle interior, or as shown, as a separately installed appliance. The particular example described below is in the context of a navigation system in a rental vehicle, where the authentication can be used to authenticate a driver of the rental vehicle. Again, this context is primarily for purposes of illustration, as the invention is not limited to rental vehicles or to vehicles.

FIG. 2 is a high-level schematic showing some components of the authentication system 10, again in the exemplary configuration as part of a navigation system. The authentication system 10 includes at least one microprocessor 14 having memory 16 (or other computer accessible storage). The memory 16 stores the programs executed by the microprocessor 14 for performing the functions described herein. The memory 16 also stores a database of roads and a database of points of interest to which the user can request a route via the roads. The databases of roads and points of interest may cover a plurality of states, provinces and/or countries. Of course, the microprocessor 14 could be multiple microprocessors or multiple cores or multiple virtual processors and the memory 16 could be any combination of electronic, magnetic, optical or even off-board storage.

The authentication system 10 may also contain one or more position-determining devices, such as GPS 18, accelerometer/gyro 20, etc. The authentication system 10 may include wireless communication, such as cell circuitry 22. The authentication system 10 may include a speaker 24 for communicating routing instructions to the driver.

The particular configuration of the hardware, route guidance and position-determining hardware and software for navigation is not critical to the present invention. Many configurations are known.

As shown in FIG. 2, the authentication system 10 may be in communication with the vehicle ignition, such as via the vehicle bus 34 (e.g. OBD-II or variations thereof). Via this communication, the authentication system 10 can give the vehicle a command whether or not to permit use of the vehicle (either by preventing ignition, in the case of an ICE, or preventing activation of an electric motor, or any way in which use or movement of the vehicle can be selectively prevented/permitted).

The authentication system may be in communication with a remote server 36, such as via the cell circuitry 22 (or any other communication system off the vehicle). The remote server 36 stores a plurality of user profiles 38 and a plurality of vehicle profiles 40. The vehicle profiles 40 may contain identifying information for a plurality of vehicles in a fleet, such as rental vehicles. The vehicle profiles 40 may include information indicating make, model, year, accessories, VIN, mileage (as continuously or periodically updated by the system 10), current location (as may be updated continuously or as appropriate by the system 10). The user profiles 38 may contain identifying information for a plurality of users or potential users (renters) of the vehicles in the rental fleet, such as information identifying one or more of the following: name, address, account number, payment methods, driver's license number, status (such as preferred customer status), rental history, rental preferences, currently-active rentals, current reservations, currently-authorized vehicles (e.g. links to the vehicle profile(s) of currently assigned/rented vehicle(s)). The user profile 38 may also include a photo of the user's face or identifying characteristics of the user's face, as may be gathered from one or more photos.

In the exemplary embodiment, the authentication system 10 can use the camera 26 for user authentication for the rental of the vehicle. For example, the camera 26 can be used to take a photo of the user and/or the user's driver's license or other authenticating documents. The image may be processed on board and/or transmitted to the server 36 (or a different server) for verification that the user is authorized to drive the vehicle. The server 36 may perform the authentication automatically (by a processor on the server 36) or the authentication may be performed by a person accessing the server 36. The server 36 may authenticate the user by comparing the image of the user to an image stored in the server 36, or by comparing the image of the driver's license (or the information gleaned from the image) to the driver's license information stored in the user's profile 38. If the server 36 authenticates the user to drive the vehicle, the server 36 may send the authentication system 10 a confirmation signal. Upon receiving the confirmation signal from the server 36, the authentication system 10 may send a signal to the vehicle bus 34 permitting the vehicle to start or to move. The camera 26 could also be used for reading barcodes or QR codes from a user, reading an address (e.g. for a navigation destination), reading a PIN code or other user identification information.

As shown in FIGS. 3-8, the camera 26 is rotatable. Generally, the camera 26 is rotatable between at least one use position, where the lens of the camera 26 looks through an opening in the housing and to a non-use position, wherein the lens of the camera 26 is directed toward an opaque portion of the housing. Additionally, or alternatively, the camera 26 may be pivoted between multiple use positions so that it may be positioned toward a user of the vehicle.

Referring to FIG. 3, the authentication system 10 includes a housing 42 in which the window 27 is formed, such as by glass or other transparent material, in an otherwise opaque housing 42. The knob 30 is rotatably mounted relative to the housing 42 proximate the window 27.

FIG. 4 is a front schematic view of the authentication system 10. The camera 26 is mounted to the knob 30, which protrudes at least partially from the housing 42. Rotation of the knob 30 imparts rotation of the camera 26 relative to the housing 42. The camera 26 is shown in a forward, use position in FIG. 4, in which a lens 44 of the camera 26 is directed outward of the housing 42 through the window 27 generally perpendicularly to a front face of the housing 42. As is known, an image sensor, such as a CMOS sensor, is behind the lens 44 and generates a digital imaged out of the image directed upon it by the lens 44. The digital image from the image sensor is sent to the microprocessor 14 (FIG. 3). An indicator 46, such as an LED indicator light, may be mounted to the housing 42 adjacent the window 27 and indicates when the camera 26 is active or when the camera 26 is recording an image.

FIG. 5 is a top view of the authentication system 10 of FIG. 4. FIG. 5 shows three additional positions of the camera 26 relative to the housing 42. If rotated to position A from the forward position (FIG. 4) by rotation of the knob 30, the camera 26 is directed forward and to the left of the housing 42. If rotated to position B from the forward position (FIG. 4) by rotation of the knob 30, the camera 26 is directed forward and to the right of the housing 42. If rotated to position C by rotation of the knob 30, the camera 26 is directed toward an opaque portion of the housing 42, such that no images could be taken at all. In this position, a user can be confident that no images are being taken, in order to preserve the user's sense of privacy. In the non-use position, the camera 26 may also be powered off or otherwise deactivated (by a switch activated by the rotating structure of the camera 26 and/or knob 30), and the indicator 46 would be deactivated. Detents in each of the positions may help retain the camera 26 in the selected position.

As shown in FIG. 6, the knob 30 may include a protrusion 48 that abuts a first stop 52 when the knob 30 is rotated all the way to position A. The protrusion 48 can move between the first stop 52 and a second stop 50 when the knob 30 is in position B, shown in FIG. 7, which is between position A and position C. The protrusion 48 abuts a second stop 50 when the knob 30 is rotated all the way to the non-use, privacy position C, shown in FIG. 8.

Figure 9:
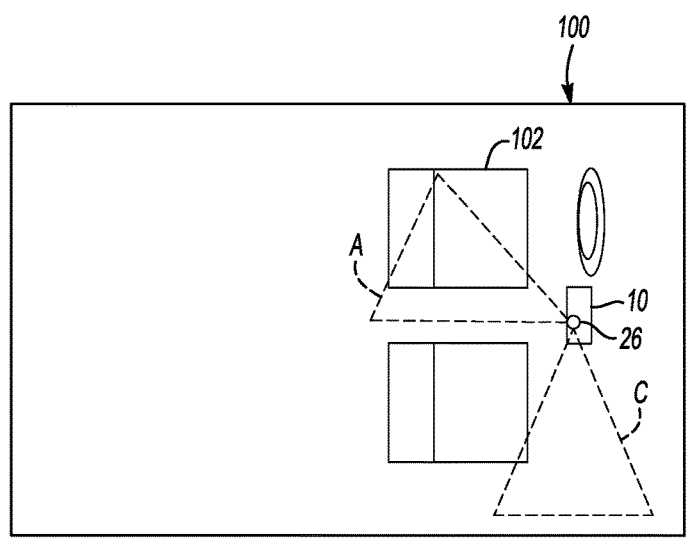
FIG. 9 is a plan view of the authentication system installed in an interior of a vehicle.

As one example, FIG. 9 is a plan view of the authentication system 10 installed in an interior of a vehicle 100. The camera is rotatable between a first position (position A, of FIG. 6), directed toward a seating area 102 within the vehicle 100 interior and a second position (position C), which is the privacy position of FIG. 8. In the privacy position C, the camera 26 is blocked by the wall of the housing of the authentication system 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, the rotation of the camera 26 could be performed automatically such as by a small motor.

What is claimed is:

1. A camera assembly comprising:
   a housing; and
   a camera movably mounted to the housing, the camera movable relative to the housing between a first position and a second position, wherein the camera can record an image out of the housing in the first position and wherein the camera faces a portion of the housing in the second position.

2. The camera assembly of claim 1 wherein the camera is movable by a user between the first position and the second position.

3. The camera assembly of claim 2 wherein the camera is rotatable relative to the housing between the first position and the second position.

4. The camera assembly of claim 1 wherein the camera is part of an authentication system installed in a vehicle.

5. The camera assembly of claim 1 further including at least one position sensor within the housing.

6. The camera assembly of claim 5 wherein the at least one position sensor includes a GPS receiver.

7. The camera assembly of claim 5 further including a processor within the housing, the processor receiving position information from the at least one position sensor and digital image information from the camera.

8. The camera assembly of claim 7 wherein the processor is programmed to provide navigation instructions based upon the position information.

9. The camera assembly of claim 1 further including a knob mounted to the camera, wherein the knob is rotatable relative to the housing to selectively move the camera between the first and second positions.

10. An authentication system comprising:
    a housing installed in a vehicle;
    at least one position sensor;
    a camera mounted to the housing, the camera movable relative to the housing between a first position where the camera can take an image of an occupant of the vehicle and a second position where the camera is blocked by a portion of the housing; and
    a processor within the housing, the processor receiving position information from the at least one position sensor, the processor receiving the image from the camera, the processor programmed to authenticate operation of the vehicle based upon the image of the occupant.

11. The authentication system of claim 10 wherein the camera is movable by a user between the first position and the second position.

12. The authentication system of claim 10 wherein the camera is rotatable relative to the housing between the first position and the second position.

13. The authentication system of claim 12 wherein the at least one position sensor includes a GPS receiver.

14. The authentication system of claim 13 wherein the processor is programmed to provide navigation instructions based upon the position information.

15. The authentication system of claim 14 wherein the camera is movable by a user between the first position and the second position.

16. A method for taking an image in a vehicle including the steps of:
   a) presenting an object to a camera in a housing in a vehicle while the camera is in a first position relative to the housing;
   b) causing the camera to take an image of the object; and
   c) after said steps a) and b), moving the camera to a second position relative to the housing, wherein the camera is blocked by a portion of the housing in the second position.

17. The method of claim 16 wherein step c) includes the step of rotating the camera relative to the housing from the first position to the second position.

18. The camera assembly of claim 1 wherein a lens of the camera is directed toward and an opaque portion of the housing in the second position.

19. The camera assembly of claim 18 wherein the lens of the camera is directed through an opening in the housing in the first position.

20. The camera assembly of claim 19 wherein the camera is rotatably mounted to the housing, such that the camera can be rotated relative to the housing between the first position and the second position.

21. The camera assembly of claim 20 wherein the camera is mounted within the housing.

* * * * *